United States Patent
Hiro

(10) Patent No.: US 8,922,850 B2
(45) Date of Patent: Dec. 30, 2014

(54) IMAGE READING APPARATUS, IMAGE FORMING APPARATUS, READING METHOD, AND RECORDING MEDIUM

(71) Applicant: Sharp Kabushiki Kaisha, Osaka (JP)

(72) Inventor: Hideyuki Hiro, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/693,097

(22) Filed: Dec. 4, 2012

(65) Prior Publication Data

US 2013/0148176 A1   Jun. 13, 2013

(30) Foreign Application Priority Data

Dec. 8, 2011   (JP) .................. 2011-269377

(51) Int. Cl.
    *H04N 1/04*   (2006.01)
    *H04N 1/00*   (2006.01)
    *G06K 15/00*  (2006.01)
    *H04N 1/46*   (2006.01)
    *G06F 3/12*   (2006.01)
    *G06K 9/40*   (2006.01)

(52) U.S. Cl.
    CPC ............. *H04N 1/04* (2013.01); *H04N 1/00909* (2013.01)
    USPC ........... 358/498; 358/474; 358/497; 358/437; 358/1.14; 358/486; 358/496; 358/504; 358/1.13; 382/274; 382/275

(58) Field of Classification Search
    USPC ........ 358/498, 474, 497, 437, 1.14, 486, 496, 358/504, 1.13; 382/274, 275
    See application file for complete search history.

(56) References Cited

U.S. PATENT DOCUMENTS

| 6,600,579 | B1  |   | 7/2003  | Kumagai et al. |
| 6,801,670 | B2  | * | 10/2004 | Kijima et al. .................. 382/274 |
| 7,212,320 | B2  | * | 5/2007  | Imoto ........................... 358/497 |
| 7,218,425 | B2  | * | 5/2007  | Saida et al. .................... 358/437 |
| 7,352,495 | B2  | * | 4/2008  | Sugeta .......................... 358/474 |
| 7,630,102 | B2  | * | 12/2009 | Kurokawa ...................... 358/474 |
| 7,688,483 | B2  | * | 3/2010  | Okada et al. ................... 358/497 |
| 7,742,180 | B2  | * | 6/2010  | Saida et al. .................... 358/1.14 |
| 7,903,299 | B2  | * | 3/2011  | Ku et al. ........................ 358/486 |
| 8,149,479 | B2  | * | 4/2012  | Okada et al. ................... 358/496 |
| 8,358,452 | B2  | * | 1/2013  | Haas et al. ..................... 358/504 |
| 2002/0176634 | A1 | * | 11/2002 | Ohashi ......................... 382/275 |
| 2005/0280867 | A1 | * | 12/2005 | Arai ............................. 358/2.1 |
| 2010/0007906 | A1 | * | 1/2010  | Okumura et al. ............. 358/1.13 |
| 2010/0020369 | A1 | * | 1/2010  | Harada ......................... 358/475 |
| 2012/0044515 | A1 | * | 2/2012  | Ikegawa ....................... 358/1.13 |

FOREIGN PATENT DOCUMENTS

| JP | 2000-349964 A | 12/2000 |
| JP | 2003-152957   | 5/2003  |
| JP | 2008-154129 A | 7/2008  |
| JP | 2010-056721   | 3/2010  |
| JP | 2011-066762 A | 3/2011  |

* cited by examiner

*Primary Examiner* — Charlotte M Baker
*Assistant Examiner* — Rury Grisham
(74) *Attorney, Agent, or Firm* — Renner, Otto, Boisselle & Sklar, LLP

(57) ABSTRACT

Contamination of a reading window is detected between documents by a contamination detection section when a plurality of sheets of documents are transferred and a transferred document is read through a reading window, transfer of the document is stopped by a stopping section based on the detection result, and a corresponding purport is displayed on a display section.

7 Claims, 16 Drawing Sheets

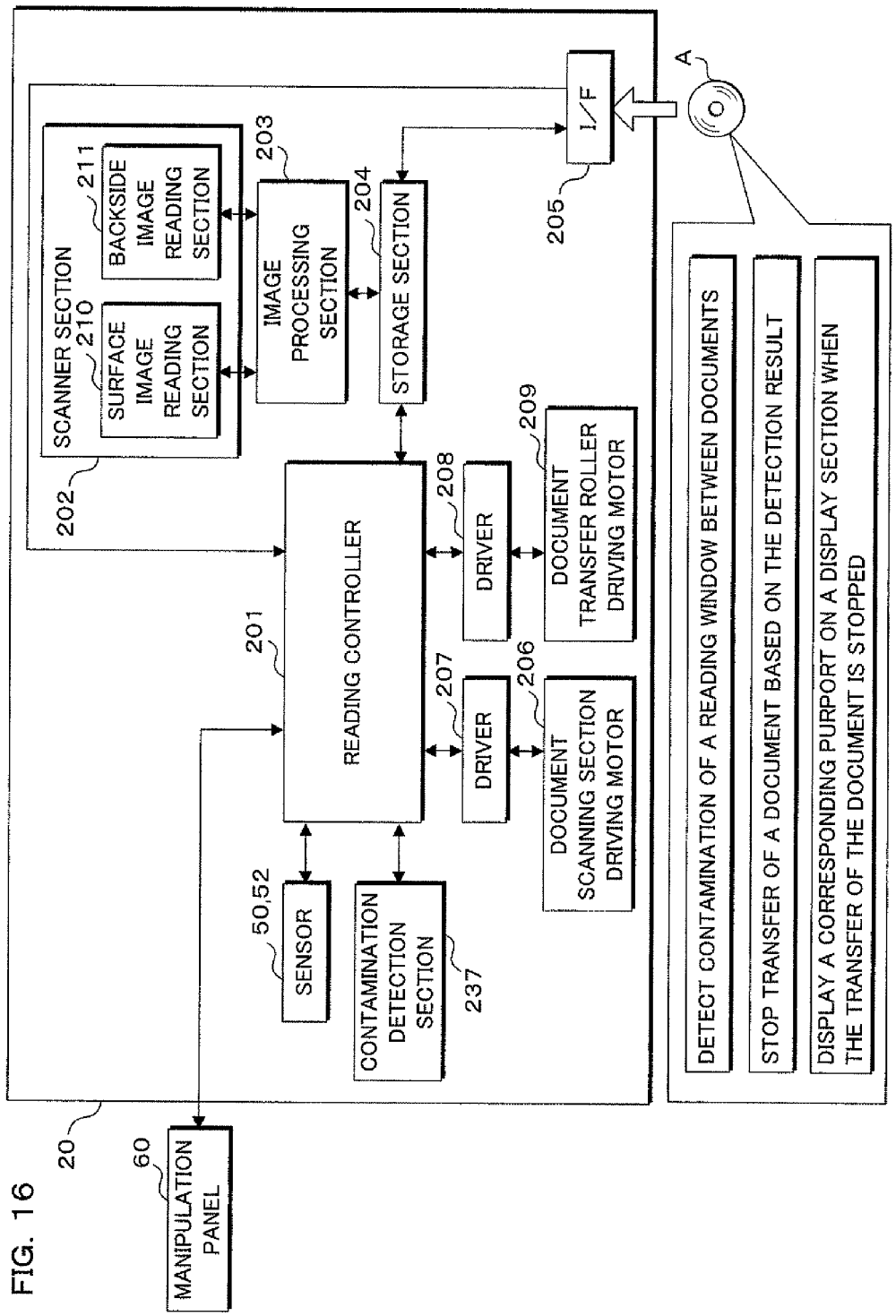

IMAGE READING APPARATUS, IMAGE FORMING APPARATUS, READING METHOD, AND RECORDING MEDIUM

CROSS-REFERENCE TO RELATED APPLICATIONS

This Nonprovisional application claims priority under 35 U.S.C. §119(a) on Patent Application No. 2011-269377 filed in Japan on Dec. 8, 2011, the entire contents of which are hereby incorporated by reference.

FIELD

The present invention relates to an image reading apparatus reading an image of a transferred document, an image forming apparatus, a reading method, and a recording medium storing a computer program.

BACKGROUND

Recently, a majority of image reading apparatuses for reading an image of a document are equipped with an auto-document feeder (ADF) that automatically receives and feeds the document. When a document is read by using the ADF, light is irradiated to the transferred document through a reading window, and reflected light from the document is obtained through the reading window, and image data of the document is generated based on the obtained reflected light.

However, in such a case, the transferred document may come into contact with the reading window to contaminate the reading window. Specifically, toner, ink, particulates or the like of the transferred document are attached to the reading window to form, for example, a stripe pattern on the generated image data.

To cope with these problems, Japanese Patent Application Laid-Open No. 2010-56721 discloses an image forming apparatus in which a dust detection reference member disposed at an upper side of a contact glass (a reading window) is read through a traveling body when a reading operation performed on a document is terminated, dust between the traveling body and the dust detection reference member is detected based on the read image, and when dust is present, a corresponding purport is reported to a user.

SUMMARY

Meanwhile, a timing at which the reading window is contaminated by the transferred document cannot be predicted, and when an operation of reading a plurality of sheets of documents is performed, an occasional operation may be fruitless. For example, in the case of reading 50 sheets of documents, when the second document is read, if ink of the document is attached to the reading window, all of the images of the second to fiftieth documents have stripe patterns formed thereon, causing the user operation to be in vain, and the record paper, electricity, memory and the like are useless, which leads to a waste of resources.

However, the image forming apparatus in relation to the foregoing Japanese Patent Application Laid-Open Publication No. 2010-56721 detects contamination at a timing when the document reading operation is terminated, and thus, it cannot solve such problems.

In consideration of the above-mentioned circumstances, it is an object of the present invention to provide an image reading apparatus an image forming apparatus, a reading method, and a recording medium storing a computer program, in which, in the case of reading images of transferred documents through a reading window, when a plurality of sheets of documents are transferred, contamination of the reading window is detected between documents, transfer of the document is stopped based on the detection result, and a corresponding purport is provided to a user, thereby preventing the foregoing problem resulting from a contaminated reading window midway in reading a plurality of sheets of documents.

According to an aspect of the present invention, there is provided an image reading apparatus for reading an image of a transferred document through a reading window, the apparatus including a detection section for detecting contamination of the reading window between documents when a plurality of sheets of documents are transferred; a stopping section for stopping transfer of the document based on the detection result from the detection section; and a display section for displaying a corresponding purport when the transfer of the document is stopped.

In the present invention, when a plurality of sheets of documents are transferred, the detection section detects contamination of the reading window between documents. For example, when contamination equal to or greater than a threshold value is detected, the stopping section stops transfer of the documents. In this manner, when the transfer of the documents is stopped, a corresponding purport is displayed on the display section.

The apparatus according to the present invention further includes: an immediately previous image display section for displaying a preview image indicating an immediately previously read document on the display section when the transfer of the document is stopped.

In the present invention, when the transfer of the documents is stopped, the immediately previous image display section displays a preview image corresponding to the document read immediately before on the display section, and thus, the user may immediately check whether or not the read image includes contamination.

The apparatus according to the present invention further includes: an instruction receiving section for receiving an instruction to resume transfer of the document, when the transfer of the document is stopped.

In the present invention, for example, after transfer of the document is stopped, the user may clean the reading window and instruct resuming of document transfer through the instruction receiving section.

The apparatus according to the present invention further includes: a lid body for covering the reading window; and a judging section for determining whether or not the lid body is opened, when the instruction receiving section receives the instruction to resume the transfer of the document, wherein when it is judged by the judging section that the lid body is opened, the detection section redetects contamination of the reading window.

In the present invention, for example, when the transfer of the document is stopped, the user may open a lid body to clean the reading window and instruct resuming of the document transfer. In other words, when the instruction receiving section receives the instruction to resume the document transfer, the judging section determines whether or not the lid body is opened, and when the judging section determines that the lid body is opened, performing cleaning by the user is expected. Therefore, the detection section redetects for contamination of the reading window.

According to another aspect of the present invention, there is provided an image forming apparatus including an image reading apparatus according to any one of the above inventions; and an image forming unit for forming an image of a document read by the image reading apparatus on a sheet.

In the present invention, an image of the document is read by the image reading apparatus, and the image of the document read by the image reading apparatus may be formed, for example, on a recording sheet by the image forming unit.

According to another aspect of the present invention, there is provided a method for reading a document, in an image reading apparatus for reading an image of a transferred document through a reading window, and including a detection section for detecting contamination of the reading window, and a display section, the method including a detecting step for detecting contamination of the reading window between documents when a plurality of sheets of documents are transferred; stopping transfer of the document based on the detection result from the detecting step; and displaying a corresponding purport on the display section when the transfer of the document is stopped.

According to another aspect of the present invention, there is provided a non-transitory recording medium storing a computer program for allowing a computer constituting an image reading apparatus which reads an image of a transferred document through a reading window and includes a detection section for detecting contamination of the reading window and a display section, to execute reading of a document, the computer program including a detecting step for causing the computer to detect contamination of the reading window between documents when a plurality of sheets of documents are transferred; a stopping step for causing the computer to stop transfer of the document based on the detection result from the detecting step; and a displaying step for causing the computer to display a corresponding purport on the display section when the transfer of the document is stopped.

In the present invention, when a plurality of sheets of documents are transferred, contamination of the reading window between the transferred documents is detected. According to the detection result, for example, when contamination equal to or greater than a threshold value is detected, the document transfer is stopped. In this way, when the document transfer is stopped, a corresponding purport is displayed on the display section.

In the present invention, the foregoing computer program is recorded in the recording medium. The computer program is read from the recording medium, and the foregoing image reading apparatus, the image forming apparatus, and the reading method are realized by a computer.

According to the present invention, in the case of reading a plurality of sheets of documents, the phenomenon that the occasional user operation is in vain due to contamination of the reading window midway and that resources such as recording sheets, electricity, memory and the like are wasted can be prevented.

The above and further objects and features will more fully be apparent from the following detailed description with the accompanying drawings.

BRIEF DESCRIPTION OF THE DRAWINGS

FIG. 16 is a functional block diagram illustrating a configuration of a major part of an image reading section of the multi-function peripheral according to a second embodiment of the present invention.

DETAILED DESCRIPTION OF NON-LIMITING EXAMPLE EMBODIMENTS

Hereinafter, a case of applying an image reading apparatus, an image forming apparatus, and a reading method according to embodiments of the present invention to a so-called digital multi-function peripheral will be described in detail by way of example, with reference to the accompanying drawings.

First Embodiment

Figure 1:
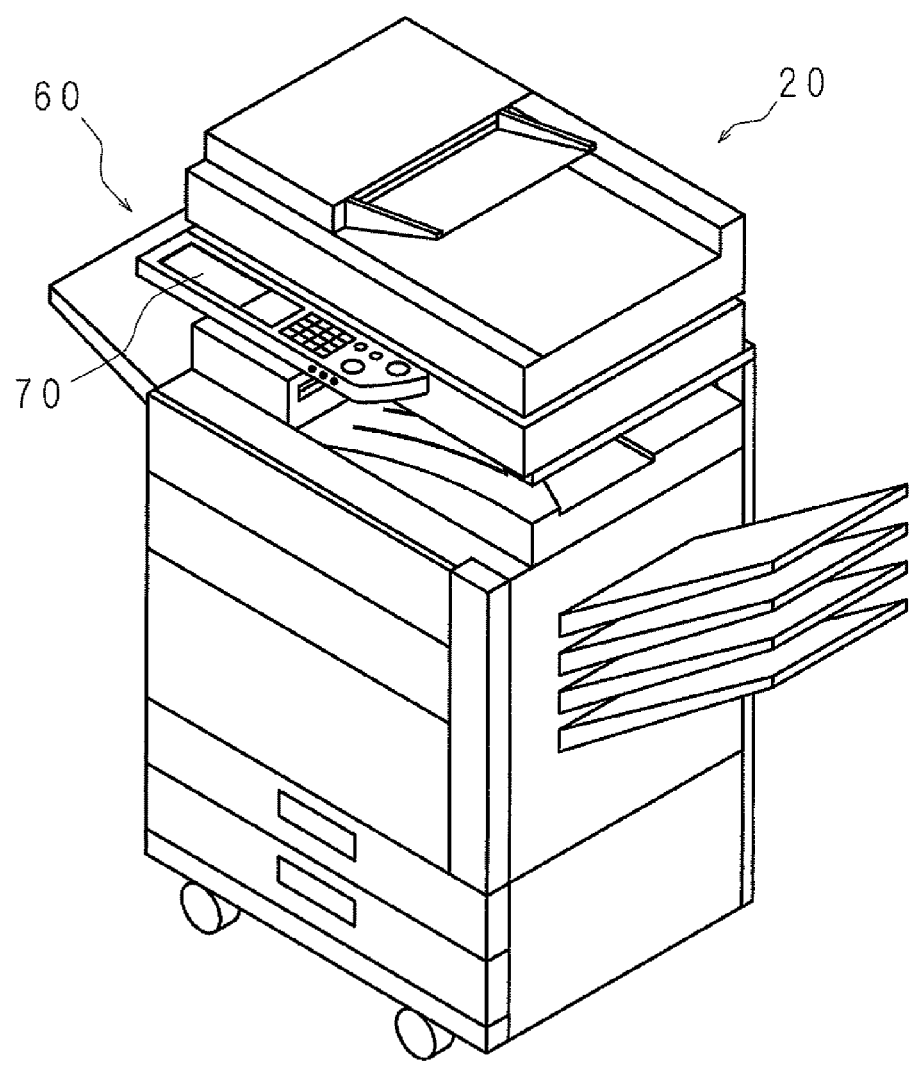
FIG. 1 is a perspective view illustrating an outer appearance of a multi-function peripheral according to a first embodiment of the present invention.
Figure 2:
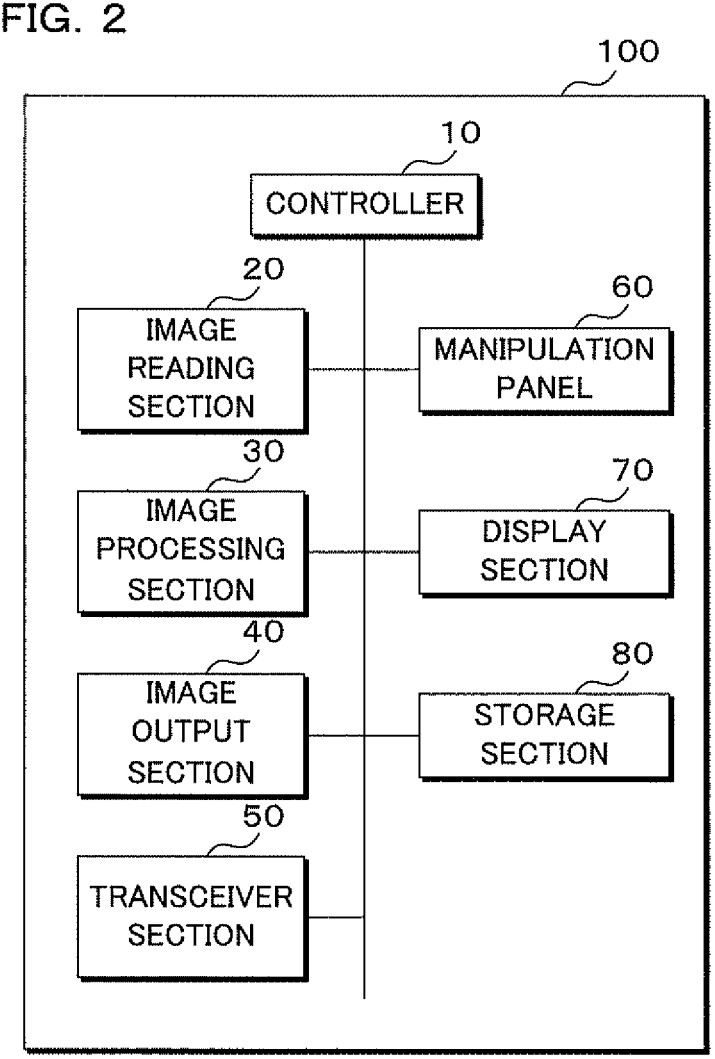
FIG. 2 is a functional block diagram illustrating a configuration of a major part of the multi-function peripheral according to the first embodiment of the present invention.

FIG. 1 is a perspective view illustrating an outer appearance of a multi-function peripheral 100 according to a first embodiment of the present invention, and FIG. 2 is a functional block diagram illustrating a configuration of a major part of the multi-function peripheral 100 according to the first embodiment of the present invention. The multi-function peripheral 100 is a digital multi-function peripheral having a color copy function, a color scanner function and the like.

The multi-function peripheral 100 includes an image reading section 20 for optically reading an image from a document, and an image processing section 30 which is connected to the image reading section 20 to generate image data corresponding to the read image. An image output section 40 for outputting an image based on the image data generated by the image processing section 30 and a transceiver section 50 for transmitting the image data generated by the image processing section 30 to the outside and receiving image data from the outside are connected to the image processing section 30. A manipulation panel 60 for receiving a manipulation from a user is connected to the image reading section 20, the image processing section 30, the image output section 40 and the transceiver section 50.

The manipulation panel 60 includes a touch panel, a numeric key and the like for receiving, by a manipulation of a user, an instruction for controlling an operation of the multi-function peripheral 100, such as a setting instruction for setting an operation mode of the multi-function peripheral 100, and a display section 70 such as a liquid crystal display for displaying information required for a manipulation. Also, the manipulation panel 60 receives designation of an operation mode in reading a document (designation of one-sided reading, double-sided reading or the like).

The display section 70 is configured by an LCD or an electroluminescence (EL) panel or the like, and the touch panel is installed to cover a display screen of the display section 70. The display section 70 displays information to be reported to the user, such as a state of the multi-function peripheral 100, a processing situation of a job, an image of a document read by the image reading section 20, checking manipulation content of the manipulation panel 60 and the like. The image reading apparatus according to the first embodiment of the present invention includes the image reading section 20, the manipulation panel 60, and the display section 70.

The image processing section 30 generates image data to be output, based on image data input from the image reading section 20. The image data to be output generated by the image processing section 30 is output as a stream to the image output section 40.

Based on the image data to be output, which has been input from the image processing section 30, the image output section 40 (the image forming unit) forms an image on a recording sheet such as paper according to thermal transfer, electrophotography, inkjet or the like.

The transceiver section 50 is configured by using a network card, a modem or the like, and transmits and receives data to and from the outside via a communication network such as a local area network (LAN) or the Internet (not shown).

The storage section 80 is configured by a non-volatile storage medium such as, for example, a flash memory, an EEPROM, an HDD, a magnetic RAM (MRAM), a ferroelectric memory (FeRAM), an ovonic unified memory (OUM) and the like. Also, the storage section 80 stores data received through the transceiver section 50.

Further, the multi-function peripheral 100 includes a controller 10. The controller 10 controls the foregoing respective hardware in various processing executed in the multi-function peripheral 100. Although not shown in drawings, the controller 10 may include a central processing unit (CPU), a ROM and a RAM.

The CPU loads a control program previously stored in the ROM onto the RAM and executes the same to thus control the foregoing various hardware and operate the entire apparatus as the multi-function peripheral 100 of the first embodiment.

Figure 3:
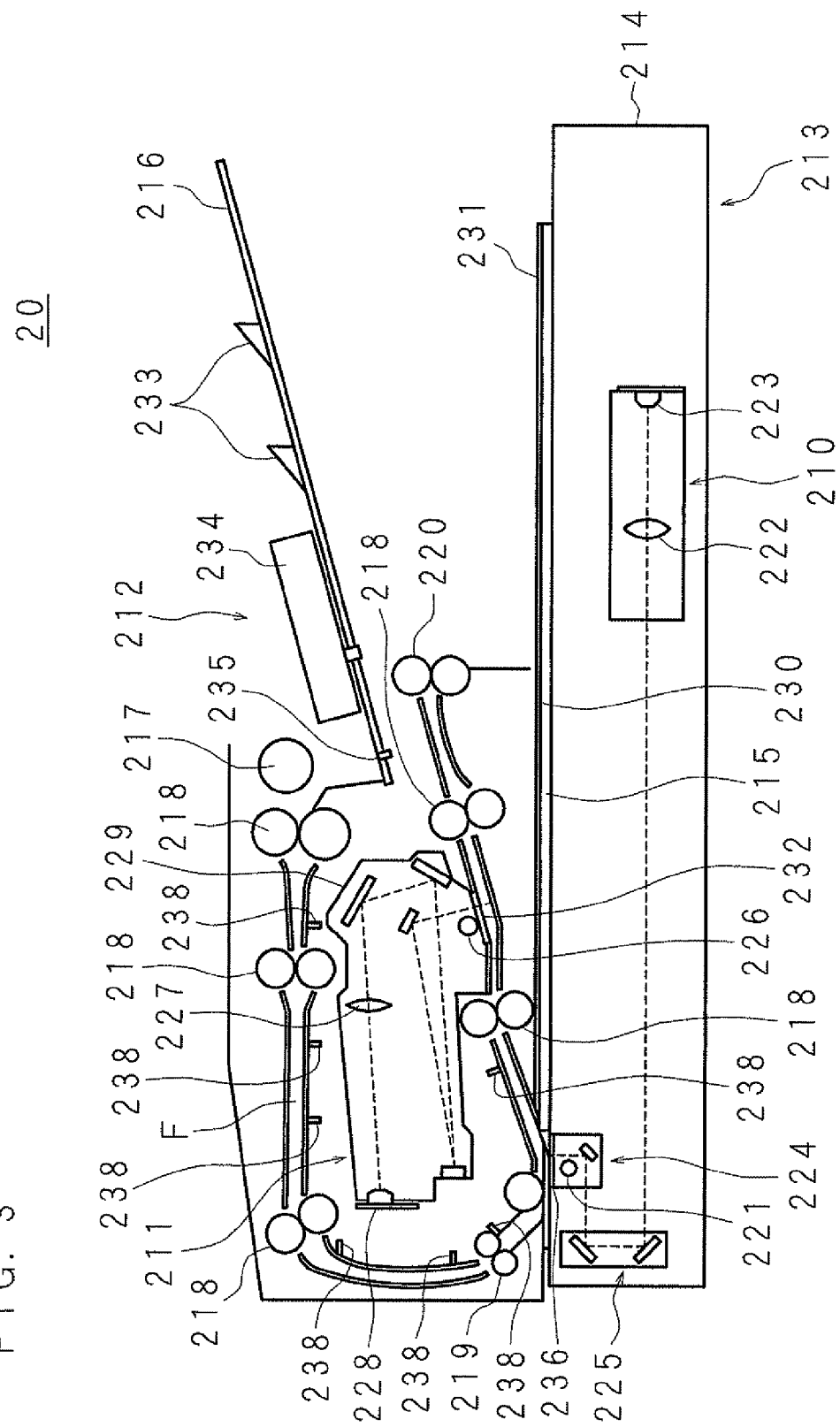
FIG. 3 is a longitudinal sectional view illustrating a configuration of a major part of an image reading section of the multi-function peripheral according to the first embodiment of the present invention.

FIG. 3 is a longitudinal sectional view illustrating a configuration of a major part of the image reading section 20 of the multi-function peripheral 100 according to the first embodiment of the present invention. As illustrated in FIG. 3, the image reading section 20 according to the first embodiment of the present invention includes an auto-document feeder (hereinafter, referred to as an "ADF") 212 for automatically transferring a document along a document transfer path F, a surface image reading section 210 for reading an image of a surface of the transferred document, and a backside image reading section 211 for reading an image of a backside of the transferred document.

The image reading section 20 is installed at an upper part of the multi-function peripheral 100 and includes the ADF 212 receiving the backside image reading section 211 and a main scanning section 213 for accommodating the surface image reading section 210. The ADF 212 (the lid body) and the main scanning section 213 are connected by a hinge (not shown), and the ADF 212 is configured to be opened and closed with respect to the main scanning section 213 by a rotation of the hinge.

The main scanning section 213 includes a housing 214 and a platen plate 215 formed of a transparent glass plate, and the surface image reading section 210 is accommodated in the housing 214.

The surface image reading section 210 includes a light source section 224 for holding a light source 221, a mirror unit 225 for holding a plurality of mirrors, a lens 222, and a CCD 223.

The main scanning section 213 may read a document according to a method in which the user places a document on the platen plate 215 for reading of a document image (hereinafter, referred to as a "document fixing method"), and a method in which a document image is read while being automatically transferred by the ADF 212 (hereinafter, referred to as a "document transfer method").

When the document is read while being automatically transferred, the light source section 224 and the mirror unit 225, while being stopped in a home position, scans an image by irradiating light from the light source 221 to the document transferred such that it passes through an upper portion of the home position (a reading window 236) by the ADF 212. The light reflected from the surface of the document is made incident to the interior of the light source section 224 through the reading window 236 configured as a transparent member such as glass, reflected by the mirror of the light source section 224, and converted by 180° by the mirror unit 225. The optical-path converted light is projected to the CCD 223 through the lens 222, and then converted into electrical image data.

Meanwhile, the ADF 212 includes a taking-in roller 217 for taking a sheet of a document placed on a document placing table 216 into the interior of the ADF 212 one by one, a plurality of pairs of conveying rollers 218 for transferring the document, which has been taken into the interior of the ADF 212, along the document transfer path F, a resist roller 219 for adjusting a paper feeding timing, and a discharge roller 220 for discharging the document having finished image reading to a discharge tray 231. Thus, the backside image reading section 211 is disposed to be brought into the document transfer path F, which draws a substantially U-shaped arc.

The backside image reading section 211 includes a light source 226, a plurality of mirrors reflecting light from the light source 226, a lens 227, and a CCD 228, and these elements are accommodated as units in a housing 229.

As mentioned above, when reading of a double-sided document is requested by the user, the backside image reading section 211 reads an image of a backside of the document transferred along the document transfer path F. Specifically, after an image of the surface of the document is read by the surface image reading section 210, the document is transferred toward the discharge tray 231 along the document transfer path F. At this time, the document passes through a lower side of the light source 226 of the backside image reading section 211. When the document passes through the lower side of the light source 226 (a reading window 232), the light source 226 irradiates light toward the backside of the document. The light reflected from the backside of the document is made incident to the interior of the housing 229 through the reading window 232 configured as a transparent member such as glass, and converted by the plurality of mirrors. The optical-path converted light is projected to the CCD 228 through the lens 227, and then converted into electrical image data.

Also, a pressing plate 230 pressing downwardly the document which is placed on the platen plate 215 of the main scanning section 213 so as to be read is installed below the ADF 212.

Further, a document placing table 216 includes a document sensor 235 for detecting the presence/absence of the document placed on the document placing table 216 and a document length sensor 233 for detecting a length of the document in a transfer direction of the document. Also, a document guide 234 regulating a horizontal direction of the document is installed on the document placing table 216.

A plurality of path sensors 238 for detecting a position of the transferred document are provided in the document transfer path F along which the document to be read is transferred. Thus, a transfer speed of the document, a position of the document and the like may be detected at a detection timing of the respective sensors. Also, it is determined whether or not a document remains in the document transfer path F based on the detection result from the path sensors 238.

Figure 4:
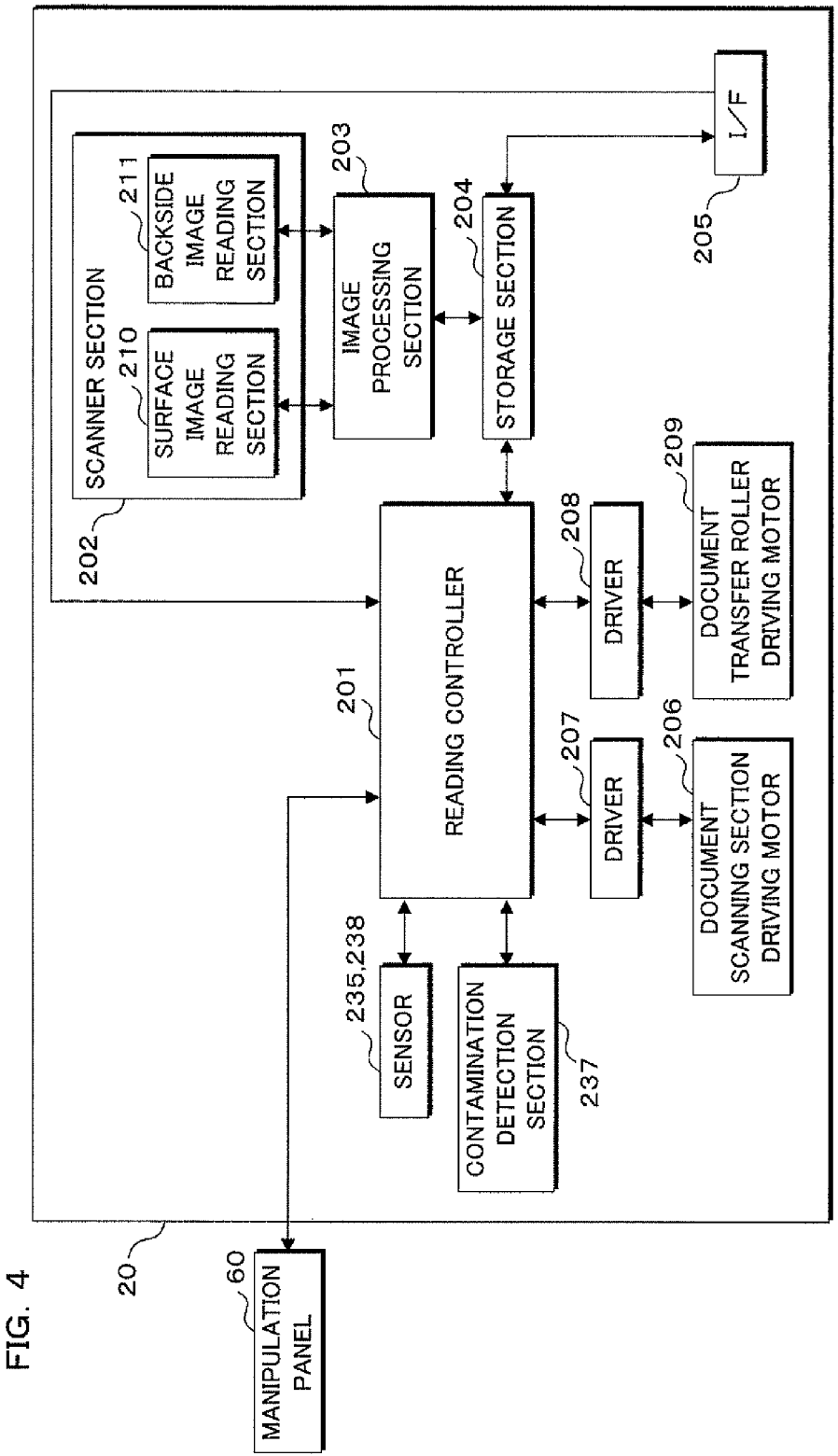
FIG. 4 is a functional block diagram illustrating a configuration of a major part of the image reading section of the multi-function peripheral according to the first embodiment of the present invention.

FIG. 4 is a functional block diagram illustrating a configuration of a major part of the image reading section 20 of the multi-function peripheral 100 according to the first embodiment of the present invention. The image reading section 20 according to the first embodiment of the present invention includes a reading controller 201, a scanner section 202, an image processing section 203, a storage section 204, an I/F 205, a driver 207 for controlling driving of a document scanning unit driving motor 206, a driver 208 for controlling driving of a document transfer roller driving motor 209, a contamination detection section 237 for detecting contamination of the reading window 236 and the reading window 232 and the like.

The scanner section 202 includes the surface image reading section 210 and the backside image reading section 211 as illustrated in FIG. 3, and obtains optical data of a document according to the foregoing method.

The image processing section 203 converts the optical data (analog data) obtained by the surface image reading section 210 or the backside image reading section 211 into electronic image data (digital data) by pages.

The storage section 204 includes a non-volatile storage medium such as, for example, a flash memory, an EEPROM, an HDD, a magnetic RAM (MRAM), a ferroelectric memory (FeRAM), an OUM or the like. Also, the storage section 204 stores various instructions input through the manipulation panel 60, optical data of a document read by the scanner section 202 and the like.

The I/F 205 is an interface for transmitting and receiving data to/from an external device. For example, data processed by the image processing section 203 is transmitted to the external device through the I/F 205.

When a document image is read according to the document fixing method, the document scanning unit driving motor 206 moves the light source section 224 and the mirror unit 225 at an appropriate speed in a sub-scanning direction, and is appropriately controlled to be driven by the driver 207 according to an instruction from the reading controller 201.

The document transfer roller driving motor 209 drives respective rollers such as the taking-in roller 217 disposed in the document transfer path F, the transfer roller 218, the resist roller 219, the discharge roller 220, and is appropriately controlled to be driven by the driver 208 according to an instruction from the reading controller 201.

The contamination detection section 237 detects a contamination state of the reading window 236 and the reading window 232. When the transferred document passes through an upper portion of the reading window 236 or a lower portion of the reading window 232, dust, toner, ink or the like of the document may be attached to the reading window 236 or the reading window 232. When printing is performed in this state, a stripe pattern is formed on the document in a sub-scanning direction. Thus, in the multi-function peripheral 100 according to the first embodiment of the preset invention, the contamination detection section 237 detects a contamination state of the reading window 236 and the reading window 232, and appropriately deals with it according to the detection result.

Figure 5:
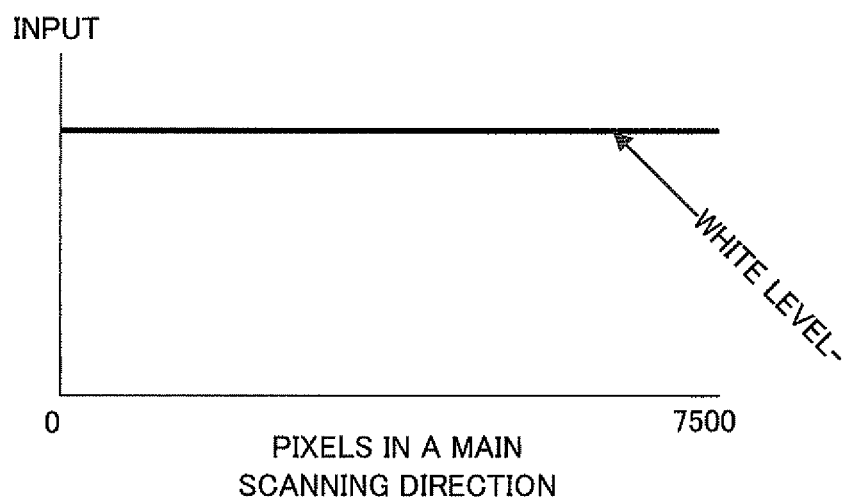
FIG. 5 is a view for illustrating detection of contamination by a contamination detection section in the image reading section of the multi-function peripheral according to the first embodiment of the present invention.
Figure 6:
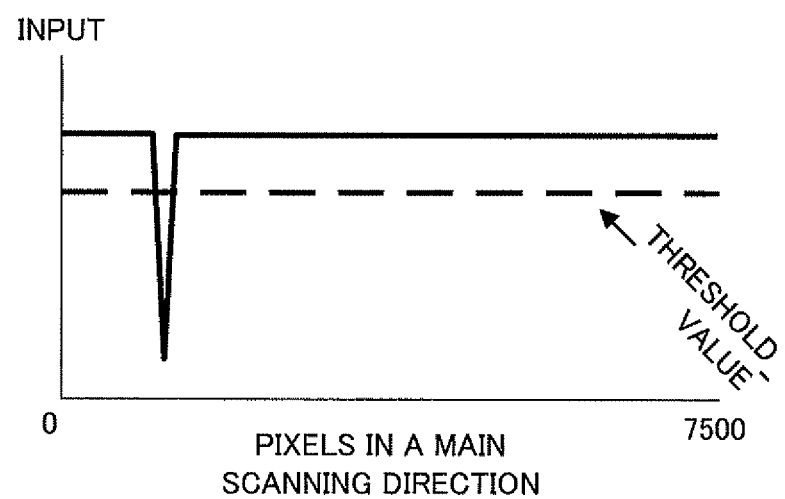
FIG. 6 is a view for illustrating detection of contamination by the contamination detection section in the image reading section of the multi-function peripheral according to the first embodiment of the present invention.

FIGS. 5 and 6 are views for illustrating detection of contamination by the contamination detection section 237 in the image reading section 20 of the multi-function peripheral 100 according to the first embodiment of the present invention. For the convenience of explanation, it is assumed that the multi-function peripheral 100 according to the first embodiment of the present invention has 7,500 pixels in a main scanning direction.

For example, when the multi-function peripheral 100 is shipped, or when the image reading section 20 is started up, scanning is performed in the main scanning direction and a white level indicating the state that the reading window 236 and the reading window 232 are not dirty is obtained (see FIG. 5). Hereinafter, the obtained white level will be referred to as a reference white level. The obtained reference white level is stored in the storage section 204.

Thereafter, when a plurality of sheets of documents are transferred, the contamination detection section 237 detects contamination of the reading window 236 or the reading window 232. More specifically, the contamination detection section 237 performs scanning in the main scanning direction between the transferred documents, and determines whether or not there is a portion in which a detected white level value is lower than the reference white level or a predetermined threshold value, thus detecting contamination.

That is, in the case where dust, toner, ink or the like of the document is attached to the reading window 236 or the reading window 232, when scanning is performed in the main scanning direction, as illustrated in FIG. 6, a portion (pixel) having a white level value reduced to below the threshold value is generated. Based on the detection result from the contamination detection section 237, a CPU 241 determines that the corresponding portion of the reading window 236 or the reading window 232 has been contaminated.

Figure 7:
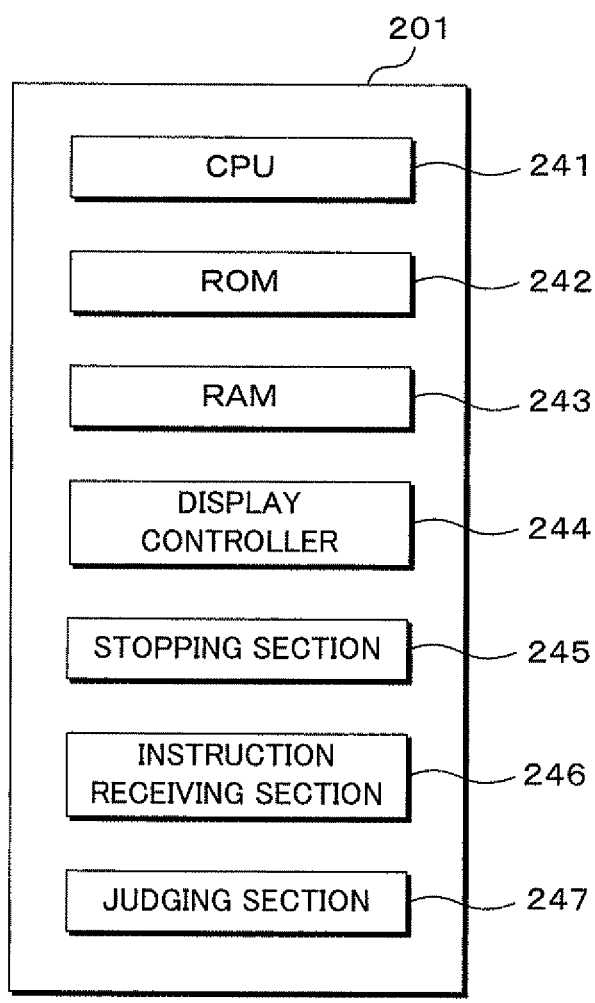
FIG. 7 is a functional block diagram illustrating a configuration of a major part of a reading controller in the image reading section of the multi-function peripheral according to the first embodiment of the present invention.

FIG. 7 is a functional block diagram illustrating a configuration of a major part of the reading controller 201 in the image reading section 20 of the multi-function peripheral 100 according to the first embodiment of the present invention. The reading controller 201 is a part for managing controlling of an overall operation of the image reading section 20, and includes the CPU 241, a ROM 242, a RAM 243, a display controller 244, a stopping section 245, an instruction receiving section 246, and a judging section 247.

The CPU 241 controls the foregoing various hardware by loading a control program previously stored in the ROM 242 onto the RAM 243 and executing it. Also, the CPU 241 receives a predetermined instruction from the user through the manipulation panel 60.

The display controller 244 (an immediately previous image display section) controls displaying of an image on the display section 70. For example, the display controller 244 displays a message to be provided to the user according to an instruction from the CPU 241, and when transfer of a document is stopped, the display controller 244 displays a preview image corresponding to a document read immediately before the stop, through the display section 70.

The stopping section 245 controls the driver 207 and the driver 208 based on the detection result from the contamination detection section 237, thereby stopping transfer (and reading) of a document, or resuming transfer (or reading) of the stopped document.

The instruction receiving section 246 receives a predetermined instruction from the user through the display section 70 (touch panel). For example, as described above, when the transfer (and reading) of the document is stopped by the stopping section 245, the display controller 244 displays a message inquiring whether to resume or cancel reading of the document on the display section 70. The instruction receiving section 246 receives a predetermined instruction through the display section 70.

The judging section 247 determines whether the ADF 212 (the lid body) is open or closed. Specifically, as described above, in the case where the transfer of the document is stopped, when the instruction receiving section 246 receives an instruction to resume transfer of the document from the user, the judging section 247 determines whether or not the ADF 212 is opened. The CPU 241 redetects contamination by the contamination detection section 237 based on the determination result from the judging section 247.

Figure 8:
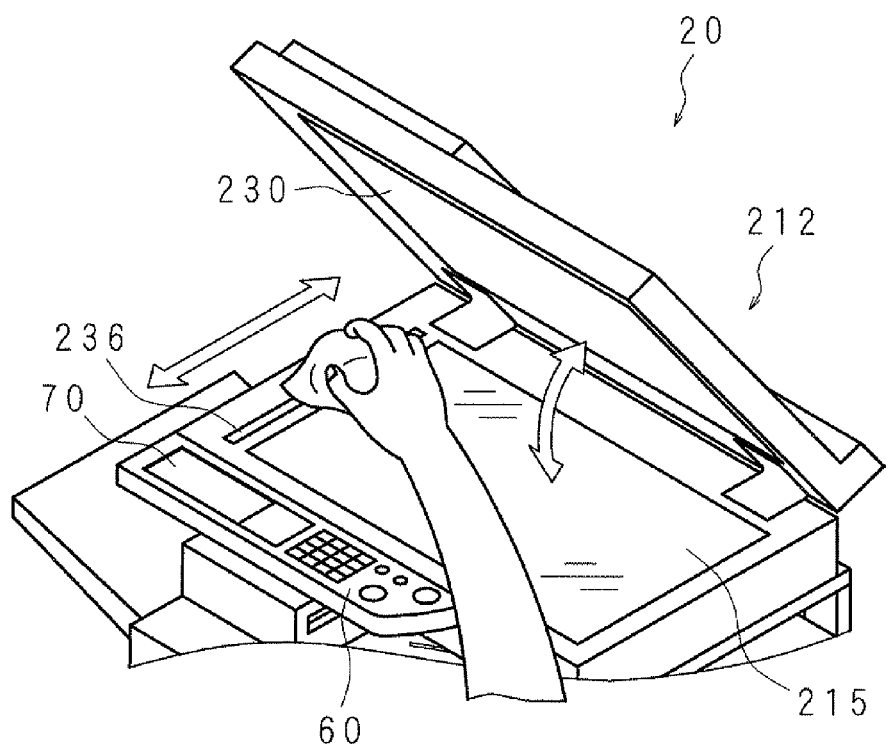
FIG. 8 is a view for illustrating a user operation of cleaning a contaminated reading window of the multi-function peripheral according to the first embodiment of the present invention.

That is, when the transfer of the document is stopped, cleaning of a corresponding part by the user is expected. In other words, as illustrated in FIG. 8, the user opens the ADF 212 at this time, removes contaminants attached to the reading window 236 or the reading window 232, and instructs to resume transfer (and reading) of the document.

Thus, when the transfer of the document is stopped and an instruction to resume transfer of the document is received from the user, the judging section 247 determines whether or not the ADF 212 is opened. The CPU 241 redetects contamination by the contamination detection section 237 based on the determination result from the judging section 247. Also, when contamination has not been removed in spite of cleaning by the user, a message indicating a corresponding purport is displayed on the display section 70.

Further, the foregoing stopping section 245, the instruction receiving section 246 and the judging section 247 may be configured by hardware logic, or may be constructed by software by executing a predetermined program by the CPU 241.

Figure 9:
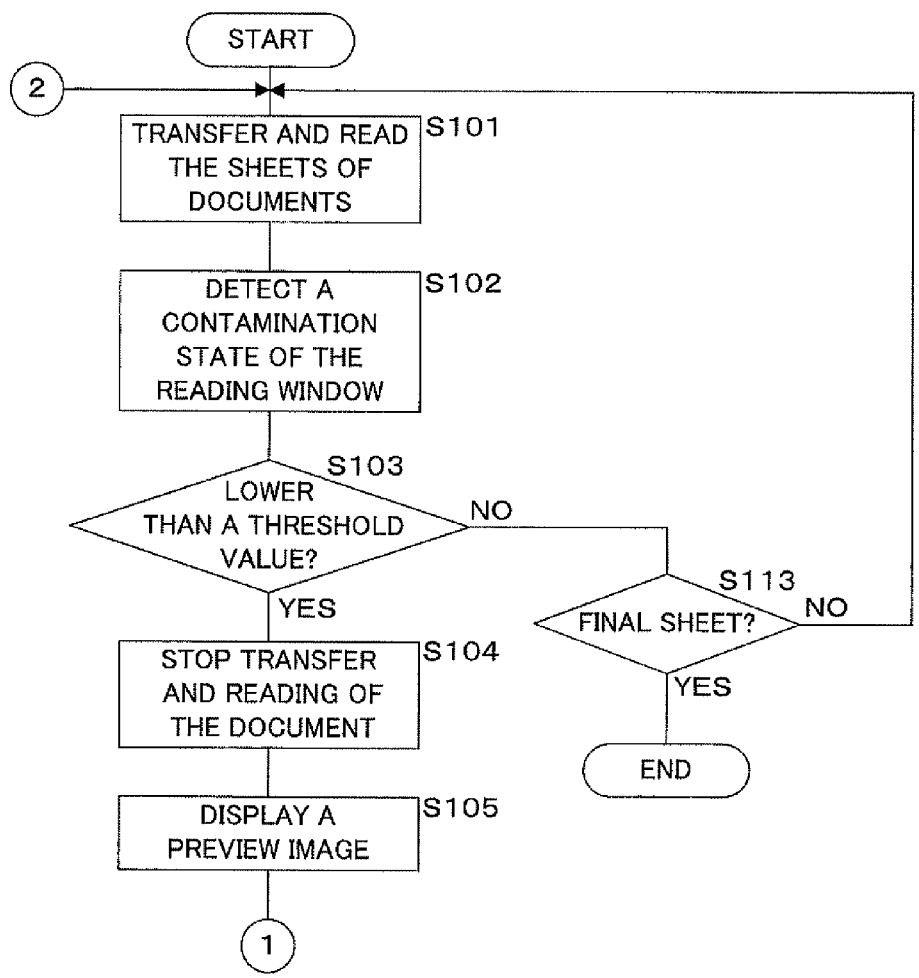
FIG. 9 is a flowchart for illustrating detection of contamination and processing based on the detected contamination in the multi-function peripheral according to the first embodiment of the present invention.
Figure 10:
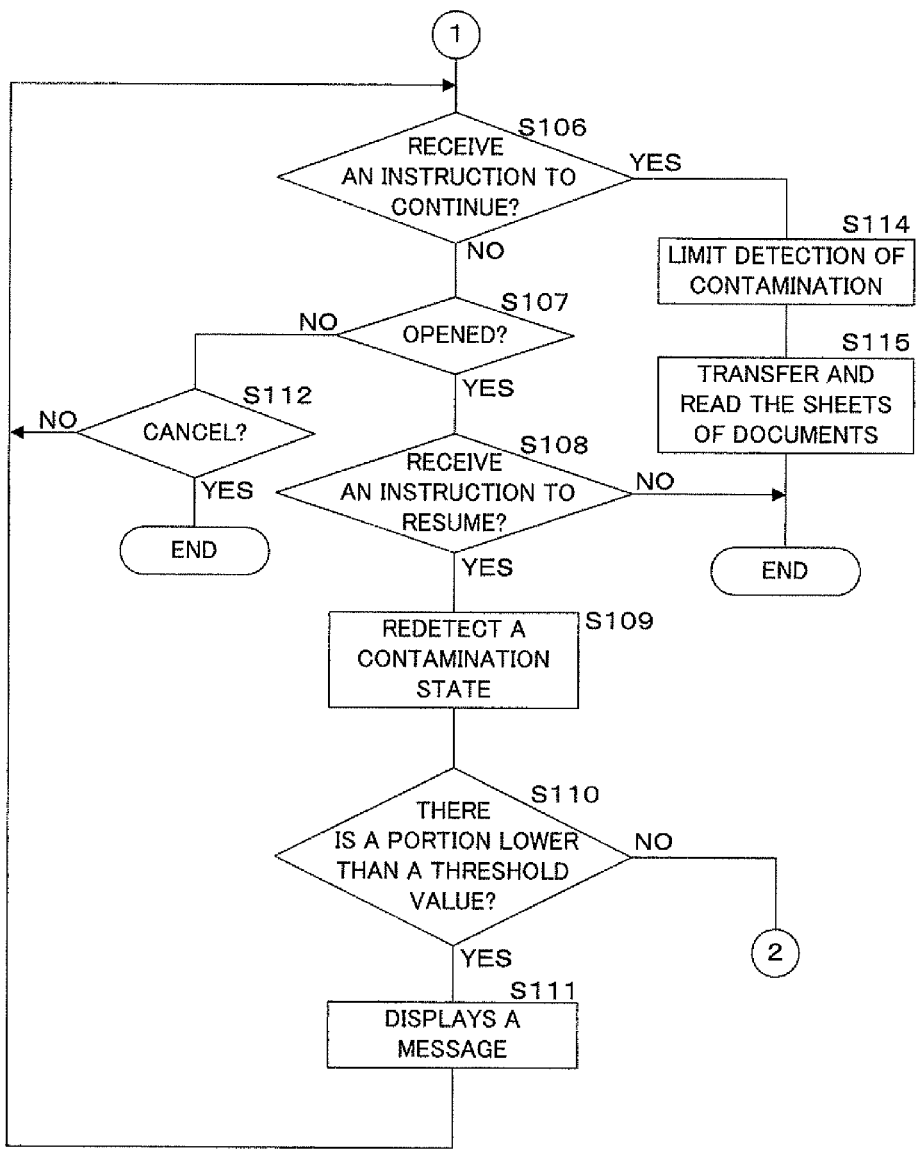
FIG. 10 is a flow chart for illustrating detection of contamination and processing based on the detected contamination in the multi-function peripheral according to the first embodiment of the present invention.

FIGS. 9 and 10 are flowcharts for illustrating detection of contamination and processing based on the detected contamination in the multi-function peripheral 100 according to the first embodiment of the present invention. Hereinafter, for the description purpose, a case of detecting contamination of the reading window 236 and performing processing based on the contamination detection used when the surface of the document is read will be described. Also, it is assumed that the user copies a plurality of sheets (e.g., five sheets) of documents.

First, the user places the sheets of documents on the document placing table 216 and appropriately manipulates the manipulation panel 60 to instruct copying of the sheets of documents. When the instruction of copying is received through the manipulation panel 60, the CPU 241 of the image reading section 20 controls the drivers 207 and 208 and automatically transfers and reads the sheets of documents placed on the document placing table 216 (step S101). The document is transferred one sheet at a time at predetermined intervals, and when the document passes through the upper portion of the reading window 236, the document is read as described above. Image data of the read document is stored in the RAM 243.

When reading of the first sheet of a document is finished, the second sheet of the document is transferred along the document transfer path F. However, before the second sheet of the document passes through the upper portion of the reading window 236, the CPU 241 instructs the contamination detection section 237 to detect contamination based on the detection result from the path sensor 238. According to the instruction from the CPU 241, scanning is performed in the scanning direction, and the contamination detection section 237 detects a contamination state of the reading window 236 (step S102). Detection of contamination by the contamination detection section 237 has already been described above, and therefore, a detailed description thereof will be omitted.

Next, the CPU 241 determines whether or not there is a portion in which a white level value detected by the contamination detection section 237 is lower than a threshold value (step S103). When the CPU 241 determines that there is no portion in which a white level value detected by the contamination detection section 237 is lower than the threshold value (NO in step S103), the CPU 241 determines whether or not the immediately previously read document is a final sheet (step S113). Such a determination is performed based on the detection result from the path sensor 238 and the document sensor 235.

When it is determined that the immediately previously read document is not a final sheet (NO in step S113), the processing is returned to the step S101 and the CPU 241 transfers the second sheet of the document to an upper portion of the reading window 236 to read it.

Further, when it is determined that the immediately previously read document is a final sheet by the CPU 241 (YES in step S113), the processing is terminated.

Meanwhile, when it is determined by the CPU 241 that there is a portion in which a detected white level value is lower than the threshold value in step S103 (YES in step S103), the stopping section 245 controls the driver 207 and the driver 208 to temporarily stop transfer and reading of the document (step S104).

Figure 11:
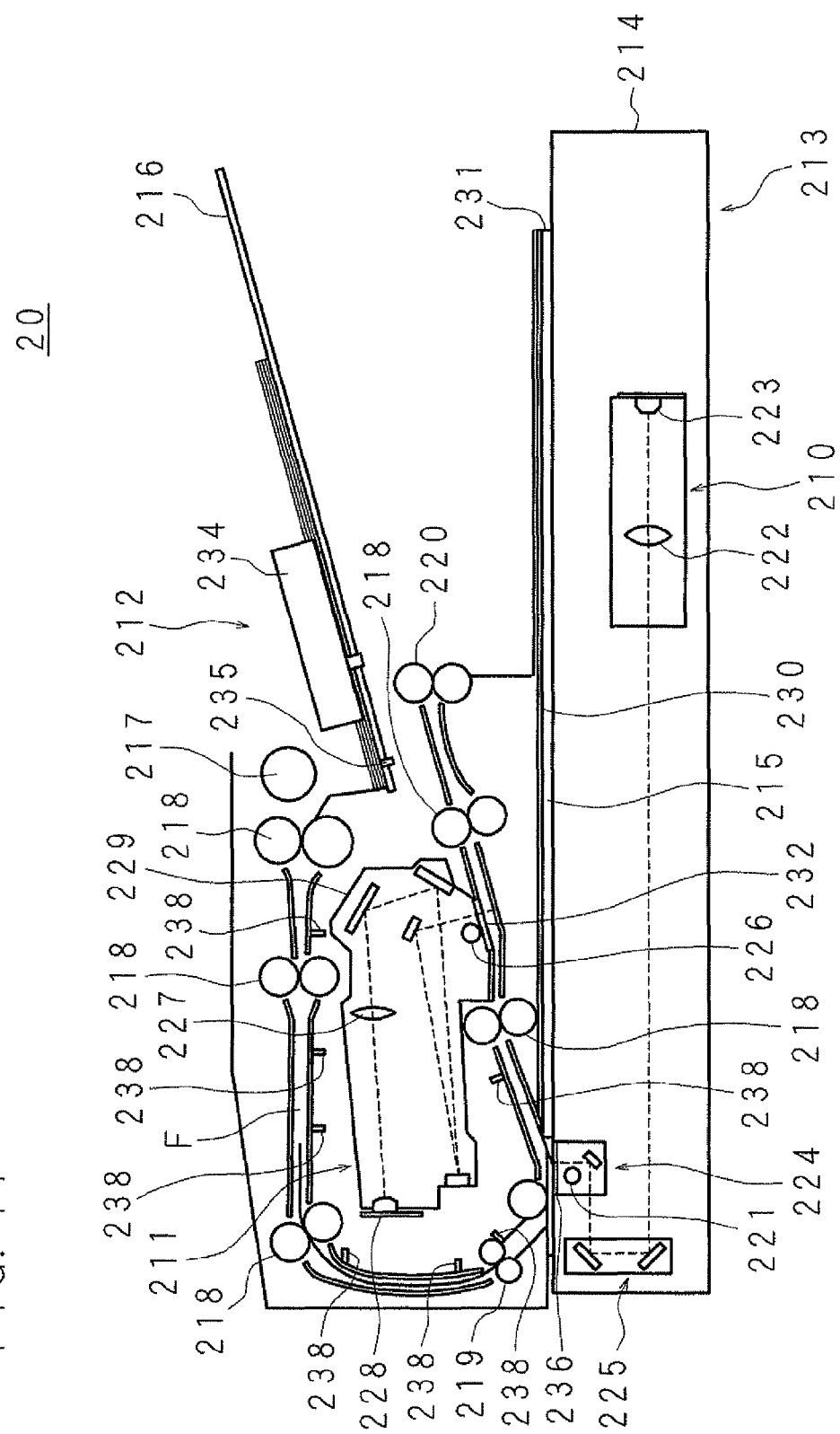
FIG. 11 is a view for illustrating stopping of transfer and reading of a document in the multi-function peripheral according to the first embodiment of the present invention.

FIG. 11 is a view for illustrating stopping of transfer and reading of a document in the multi-function peripheral 100 according to the first embodiment of the present invention. When the transfer and reading of a document are stopped, as illustrated in FIG. 11, an already read first sheet of the document has been discharged to the discharge tray 231 and a second sheet of the document not read yet remains in the document transfer path F.

The present invention is not limited thereto and the documents remaining in the document transfer path F may all be discharged to the discharge tray 231 before the transfer and reading of the document is stopped.

Thereafter, the display controller 244 displays a purport of stopping transfer and reading of the document and a preview image corresponding to the immediately previously read document on the display section 70 (step S105).

Figure 12:
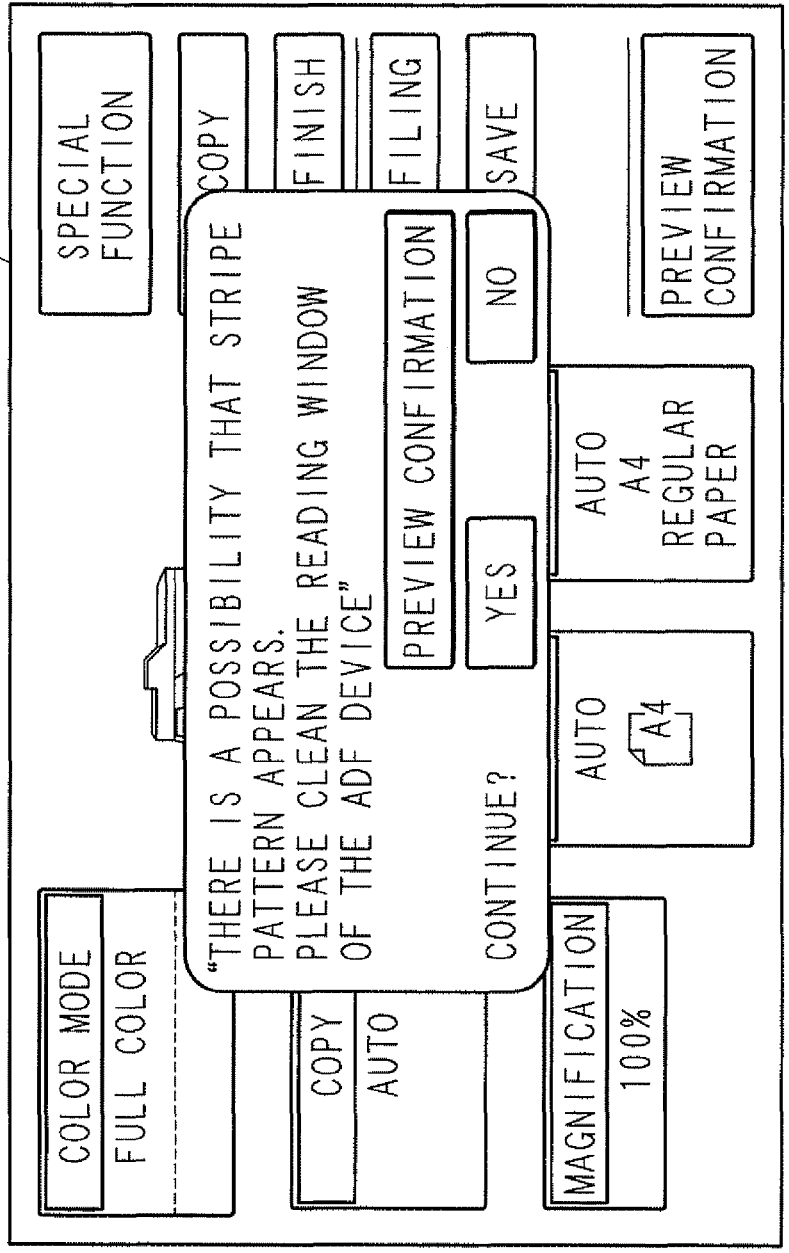
FIG. 12 is a view illustrating an example of a screen displayed on a display section when the transfer and reading of a document are stopped in the multi-function peripheral according to the first embodiment of the present invention.
Figure 13:
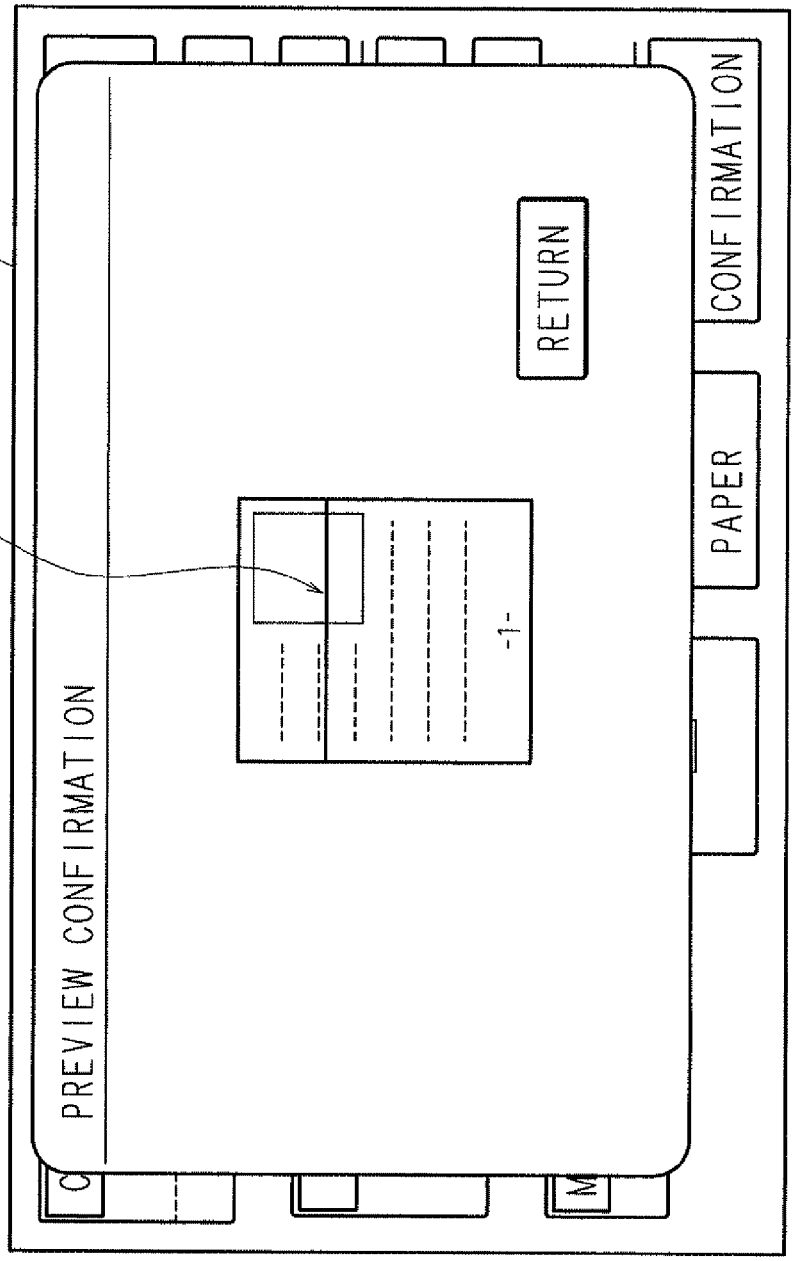
FIG. 13 is a view illustrating an example of a preview image displayed on the display section when the transfer and reading of the document are stopped in the multi-function peripheral according to the first embodiment of the present invention.

FIG. 12 is a view illustrating an example of a screen displayed on the display section 70 when the transfer and reading of a document are stopped in the multi-function peripheral 100 according to the first embodiment of the present invention, and FIG. 13 is a view illustrating an example of a preview image displayed on the display section 70 when the transfer and reading of a document are stopped in the multi-function peripheral 100 according to the first embodiment of the present invention.

When the transfer and reading of the document are stopped, the display controller 244 displays text such as "There is a possibility that stripe pattern appears. Please clean the reading window of the ADF device," a "preview confirmation" soft key for receiving an instruction to display a preview image corresponding to an immediately previously read document, and soft keys of "Yes" and "No" for receiving an instruction as to whether or not transfer and reading of the document are to be continued, on the display section 70.

Further, the present invention is not limited thereto, and only the text such as "There is a possibility that stripe pattern appears. Please clean the reading window of the ADF device" may be displayed, or only the soft keys of "Yes" and "No" for receiving an instruction as to whether or not transfer and reading of the document are to be continued may be displayed.

For example, when the user touches the "preview confirmation" soft key, as illustrated in FIG. 13, the display controller 244 displays a preview image corresponding to the immediately previously read first sheet of the document on the display section 70. Thus, the user may select whether or not to continue transfer and reading of the document, while viewing the preview image.

At this time, the CPU 241 determines whether or not an instruction to continue transfer and reading of the document has been received (step S106). Such a determination may be performed by monitoring a signal from the display section 70 (touch panel) by the CPU 241.

For example, when the user touches the soft key "Yes" in FIG. 12, the CPU 241 determines that an instruction to continue transfer and reading of the document has been received (YES in step S106).

In this manner, when the user instructs to continue transfer and reading of the document although the user has viewed the appearance of a stripe pattern resulting from contamination (see FIG. 13), it means that the display of the stripe pattern is negligible. Thus, such a user's intention is reflected in follow-up processing.

That is, in a following process, when the document is transferred and read, the CPU 241 limits detection of contamination by the contamination detection section 237 (step S114).

Thereafter, in a state in which detection of contamination by the contamination detection section 237 is stopped, the remaining second to fifth sheets of the document are transferred and read (step S115).

Meanwhile, when it is determined that the instruction to continue transfer and reading of the document is not received in step S106 (NO in step S106), the CPU 241 determines whether or not the ADF 212 is opened (step S107).

When it is determined that the ADF 212 is not opened (NO in step S107), the CPU 241 determines whether or not an instruction to cancel transfer and reading of the document has been received (step S112). Such a determination is performed by the CPU 241 monitoring whether or not the soft key "No" in FIG. 12 has been manipulated.

For example, when the user touches the soft key "No," the CPU 241 determines that an instruction to cancel transfer and reading of the document has been received (YES in step S112), and then terminates the processing.

Further, when the soft key "No" is not touched by the user for a predetermined period of time, the CPU 241 determines that an instruction to cancel transfer and reading of the document has not been received (NO in step S112), and the processing is returned to step S106.

Meanwhile, when the CPU 241 determines that the ADF 212 is opened in step S107 (YES in step S107), the display controller 244 displays the soft key for receiving an instruction to resume transfer and reading of the document which has been stopped, on the display section 70.

Also, the present invention is not limited thereto. In step S112, for example, when the user manipulates the stop key of the manipulation panel 60 or when the user takes out the document placed on the document placing table 216, it may be configured that the CPU 241 receives it as an instruction to cancel transfer and reading of the document.

Figure 14:
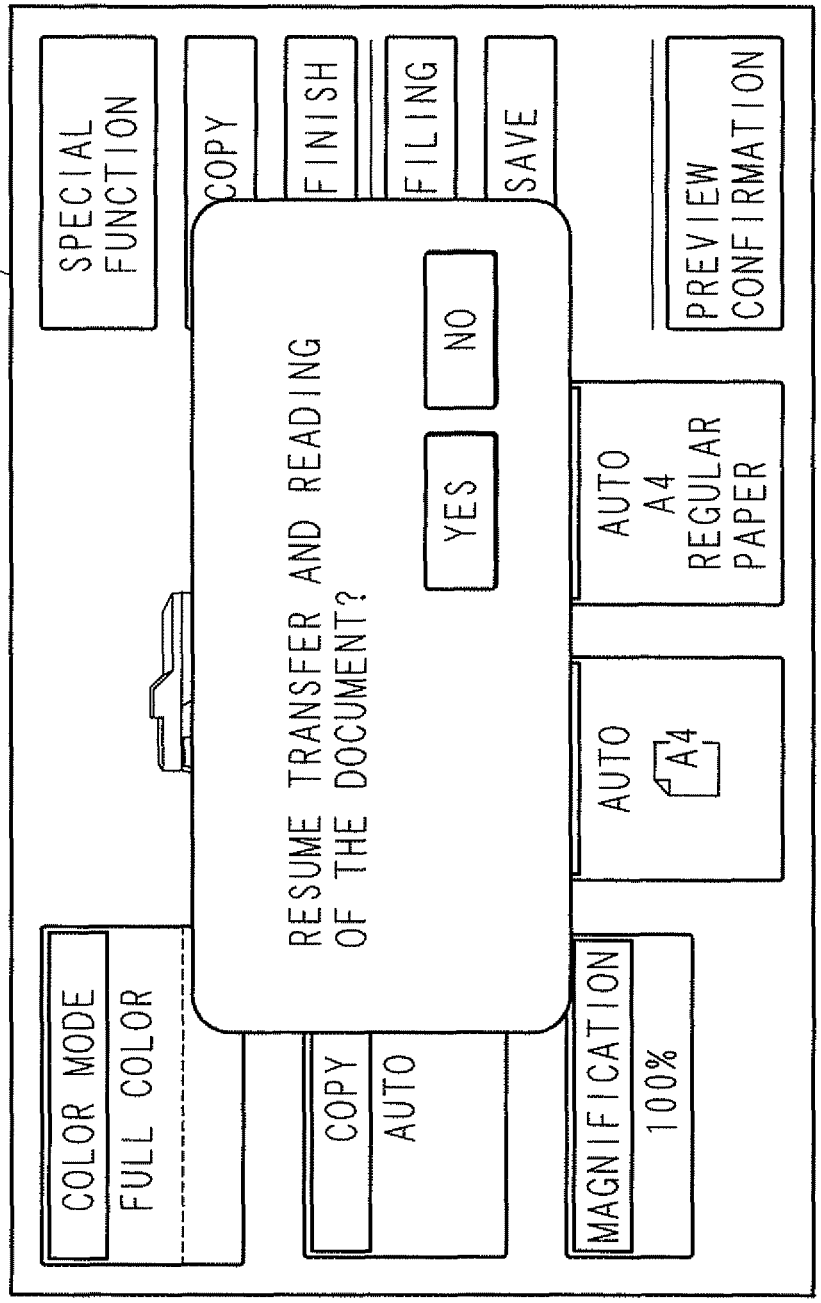
FIG. 14 is a view illustrating an example of a receiving screen for receiving an instruction to resume the transfer and reading of the document in the multi-function peripheral according to the first embodiment of the present invention.

FIG. 14 is a view illustrating an example of a receiving screen for receiving an instruction to resume transfer and reading of a document in the multi-function peripheral 100 according to the first embodiment of the present invention. As described above, when the ADF 212 is opened in a state in which the transfer and reading of the document are stopped, removal of contamination of the reading window 236 by the user is assumed. Thus, a receiving screen is displayed on the display section 70 and an instruction to resume transfer and reading of the document is received from the user.

The soft key "Yes" for receiving an instruction to resume transfer and reading of the document and the soft key "No" for receiving an instruction not to resume transfer and reading of the document are displayed on the receiving screen of FIG. 14, and the user, who has finished cleaning, touches one of the soft keys as necessary.

At this time, the CPU 241 determines whether or not the instruction to resume transfer and reading of the document has been received by monitoring the soft key "Yes" and the soft key "No" of the receiving screen (step S108).

For example, when the user touches the soft key "No" of the receiving screen, the CPU 241 determines that the instruction to resume transfer and reading of the document has not been received (NO in step S108), and terminates the processing.

Meanwhile, when the user touches the soft key "Yes" of the receiving screen, the CPU 241 determines that the instruction to resume transfer and reading of the document has been received (YES in step S108), and instructs the contamination detection section 237 to redetect a contamination state of the reading window 236.

According to the instruction from the CPU 241, the contamination detection section 237 redetects a contamination state (white level value) of the reading window 236 (step S109).

Next, the CPU 241 determines whether or not there is a portion in which the white level value redetected by the contamination detection section 237 is lower than a threshold value (step S110). When the CPU 241 determines that there is no portion in which the white level value redetected by the contamination detection section 237 is lower than the threshold value (NO in step S110), the processing is returned to step S101 and a second sheet of the document is transferred and read.

Meanwhile, when the CPU 241 determines that there is a portion in which the white level value redetected by the contamination detection section 237 is lower than the threshold value (YES in step S110), the display controller 244 displays a message for urging cleaning again on the display section 70 (step S111). Thereafter, the processing is returned to step S106.

Figure 15:
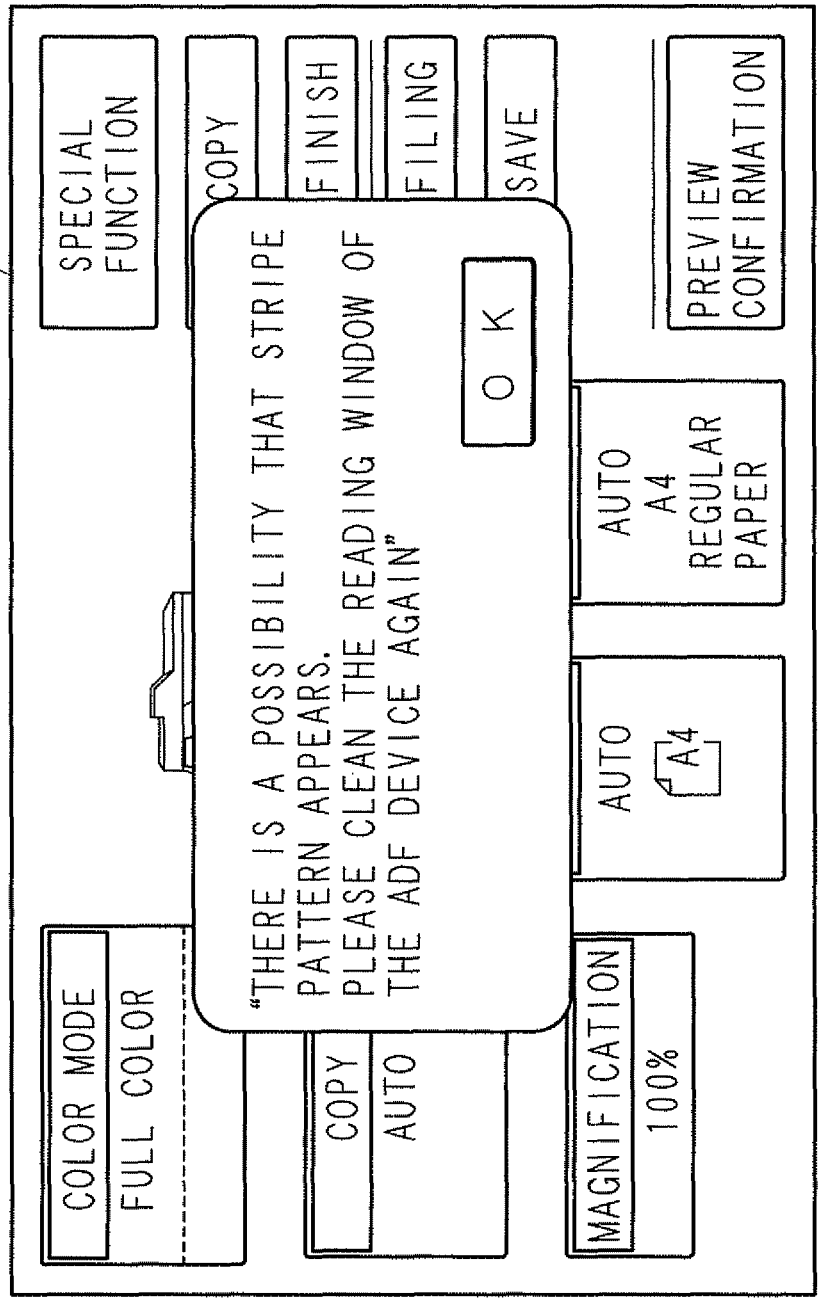
FIG. 15 is a view illustrating an example of a screen for urging to clean again in the multi-function peripheral according to the first embodiment of the present invention.

FIG. 15 is a view illustrating an example of a screen for urging to clean again in the multi-function peripheral 100 according to the first embodiment of the present invention. Text such as "There is a possibility that stripe pattern appears. Please clean the reading window of the ADF device again" is displayed on the screen.

In the above description, the case where contamination of the reading window 236 is detected and processing is performed based on the detection result is taken as an example, but the present invention is not limited thereto. It should be understood that the present invention may also be applicable to detection of contamination of the reading window 232 used in reading a backside of the document and processing based on the detection result.

Second Embodiment

FIG. 16 is a functional block diagram illustrating a configuration of a major part of an image reading section 20 of a multi-function peripheral 100 according to the second embodiment of the present invention. The image reading section 20 according to the second embodiment is configured to provide a computer program for performing an operation to a portable recording medium A such as a CD-ROM through an I/F 205. Further, the image reading section 20 according to the second embodiment is configured to download such a computer program through a communication unit (not shown) from an external device. Details thereof will be described below.

The image reading section 20 according to the second embodiment includes an external (or internal) recording medium reading device (not shown). A portable recording medium A storing a program for detecting contamination of a reading window between documents, stopping transfer of a document based on the detection result, and displaying a corresponding purport on a display section when the transfer of the document is stopped and the like is inserted into the recording medium reading device, and for example, the CPU 241 installs the program on the ROM 242. Such a program is loaded onto and executed in the RAM 243. Thus, it serves as the image reading section 20 according to the second embodiment of the present invention.

As the recording medium, it may be so-called program medium, a tape system such as a magnetic tape or a cassette tape, a disk system including a magnetic disk such as a flexible disk or a hard disk, and an optical disk such as a CD-ROM, MO, MD, or DVD, a card system such as an IC card (including a memory card), or optical card, or a medium fixedly containing a program code including a semiconductor memory such as a mask ROM, an EPROM, an EEPROM, a flash ROM or the like.

It may also be a medium flexibly containing a program code to download a program code from a network through the communication unit. When a program is downloaded from a communication network in this manner, the download program may be previously stored in a main device or may be installed from a different recording medium. Note that the present invention may be realized even in the form of a computer data signal buried in a carrier, obtained by implementing the program code as an electrical transmission.

The same components as those of the first embodiment are denoted by the same reference numerals, and a detailed description thereof will be omitted.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image reading apparatus for reading an image of a transferred document through a reading window, the image reading apparatus comprising:
   a detection section for detecting contamination of the reading window between documents when a plurality of sheets of documents are transferred;
   a stopping section for stopping transfer of the document based on the detection result from the detection section;
   a display section for displaying a corresponding purport when the transfer of the document is stopped; and
   an immediately previous image display section for displaying a preview image indicating an immediately previously read document on the display section when the transfer of the document is stopped.

2. The image reading apparatus according to claim 1, further comprising an instruction receiving section for receiving an instruction to resume transfer of the document, when the transfer of the document is stopped.

3. The image reading apparatus according to claim 2, further comprising:
   a lid body for covering the reading window; and
   a judging section for judging whether or not the lid body is opened, when the instruction receiving section receives the instruction to resume the transfer of the document,
   wherein when it is judged by the judging section that the lid body is opened, the detection section redetects contamination of the reading window.

4. The image reading apparatus according to claim 1, further comprising:
   a document transfer path; and
   a tray on which the document discharged through the transfer path is placed,
   wherein when the transfer of the document is stopped, the document in the transfer path is discharged to the tray.

5. An image forming apparatus comprising:
   the image reading apparatus according to claim 1; and
   an image forming unit for forming an image of a document read by the image reading apparatus on a sheet.

6. A method for reading a document, in an image reading apparatus for reading an image of a transferred document through a reading window, and including a detection section for detecting contamination of the reading window, and a display section, the method comprising:
   a detecting step for detecting contamination of the reading window between documents when a plurality of sheets of documents are transferred;
   a stopping step for stopping transfer of the document based on the detection result from the detecting step;

a displaying step for displaying a corresponding purport on the display section when the transfer of the document is stopped; and an immediately previous image displaying step for displaying a preview image indicating an immediately previously read document on the display section when the transfer of the document is stopped.

7. A non-transitory computer-readable recording medium storing a computer program for allowing a computer constituting an image reading apparatus which reads an image of a transferred document through a reading window and includes a detection section for detecting contamination of the reading window and a display section, to execute reading of a document, the computer program comprising:

a detecting step for causing the computer to detect contamination of the reading window between documents when a plurality of sheets of documents are transferred;

a stopping step for causing the computer to stop transfer of the document based on the detection result from the detecting step;

a displaying step for causing the computer to display a corresponding purport on the display section when the transfer of the document is stopped; and an immediately previous image displaying step for causing the computer to display a preview image indicating an immediately previously read document on the display section when the transfer of the document is stopped.

\* \* \* \* \*